United States Patent [19]

Radun

[11] Patent Number: 5,381,081
[45] Date of Patent: Jan. 10, 1995

[54] SWITCHED RELUCTANCE GENERATOR FOR GENERATING AC POWER

[75] Inventor: Arthur V. Radun, Ballston Lake, N.Y.

[73] Assignee: General Electric Company, Schenectady, N.Y.

[21] Appl. No.: 67,879

[22] Filed: May 27, 1993

[51] Int. Cl.[6] .............................. H02P 8/00; H02P 9/00
[52] U.S. Cl. ........................................ 322/94; 318/696; 318/701
[58] Field of Search ................................ 322/10, 29, 94; 290/38 R, 46; 318/254, 696, 701

[56] References Cited

U.S. PATENT DOCUMENTS

| | | | |
|---|---|---|---|
| 3,678,352 | 7/1972 | Bedford. | |
| 4,143,308 | 3/1979 | Deplant et al. | 318/701 X |
| 4,442,396 | 4/1984 | Hucker | 322/21 |
| 4,710,840 | 12/1987 | Shepler et al. | 361/20 |
| 4,998,052 | 3/1991 | Erdman et al. | 318/701 |
| 5,006,781 | 4/1991 | Schultz et al. | 322/25 |
| 5,012,177 | 4/1991 | Dhyanchand et al. | 322/10 |
| 5,043,643 | 8/1991 | Hedlund et al. | 318/701 X |
| 5,115,181 | 5/1992 | Sood | 318/701 |
| 5,138,244 | 8/1992 | Bahn | 318/254 X |
| 5,214,365 | 5/1993 | Bahn | 318/701 |
| 5,260,635 | 11/1993 | Bahn | 318/701 |
| 5,274,287 | 12/1993 | Bahn | 318/701 X |
| 5,278,482 | 1/1994 | Bahn | 318/701 |
| 5,289,107 | 2/1994 | Radun et al. | 322/94 |

*Primary Examiner*—Kristine L. Peckman
*Attorney, Agent, or Firm*—Jill M. Breedlove; Marvin Snyder

[57] ABSTRACT

A switched reluctance generator system provides an ac output voltage through only one stage of power conversion. The system includes a converter for coupling a dc voltage via a dc excitation bus to a switched reluctance generator and thereby providing excitation power thereto, and further includes a separate ac generator bus for providing the ac output voltage. A bridge-type configuration of thyristor-type switching devices are used to couple power generated across each respective machine phase winding to the ac generator bus. During initiation of generating action and load faults, the thyristor-type switching devices are turned off such that the ac generator bus is effectively disconnected from the switched reluctance generator, allowing the excitation bus to be charged to a desired level. During normal generating operation, the thyristor-type switching devices are appropriately gated, increasing and decreasing current as needed, to provide the ac output voltage on the ac generator bus. Furthermore, the switched reluctance ac generator system is self-excited after generating action is initiated, even during load faults, and is also capable of resuming normal generating operation following occurrence of a short-circuit fault.

11 Claims, 8 Drawing Sheets

SWITCHED RELUCTANCE GENERATOR FOR GENERATING AC POWER

This invention was made with Government support under contract F33615-90-C-2052 awarded by the U.S. Army. The U.S. Government has certain rights in this invention.

RELATED APPLICATION

This application is related to commonly assigned U.S. patent application Ser. No. 08/101,623 of A. V. Radun, filed concurrently herewith and incorporated by reference herein.

FIELD OF THE INVENTION

The present invention relates generally to switched reluctance generator systems and, more particularly, to a switched reluctance generator system for generating ac power.

BACKGROUND OF THE INVENTION

A switched reluctance machine is a brushless, synchronous machine which has an unequal number of salient rotor and stator poles. There is a concentrated winding on each of the stator poles, but no windings or permanent magnets on the rotor. The stator pole windings on opposite stator poles are energized simultaneously. Ideally, the flux entering the rotor from one stator pole balances the flux leaving the rotor from the diametrically opposite stator pole, so that there is no mutual magnetic coupling among the phases.

In operation, there is an electromagnetic force of attraction between the rotor poles and stator poles of a switched reluctance machine. Hence, by properly positioning the stator phase excitation waveforms relative to the rotor angular position, forward or reverse operation and motoring or generating operation can be achieved. In particular, if the windings of two diametrically opposite stator poles are excited when a pair of rotor poles are approaching alignment with these excited stator poles, motoring torque is produced; and when the rotor poles are moving out of alignment with the excited stator poles, generating torque is produced.

A switched reluctance generator typically generates dc power. To generate ac power using a switched reluctance generator, an inverter is required. Disadvantageously, therefore, the generated power passes through two stages of power conversion, rather than one, resulting in a loss of efficiency.

A conventional switched reluctance generator system is a self-excited system that draws its excitation power from the same dc bus into which it generates power. Such a system is electromagnetically limited to a maximum load current that it is capable of delivering without losing its self-excitation. If the maximum load current for the particular switched reluctance generator system is exceeded, e.g., in case of a fault such as a short circuit, then the generated output voltage drops to zero. Unfortunately, since the system is self-excited, once the voltage drops to zero, generating operation cannot be resumed without external intervention; and a relatively large power source is required to supply the overload, clear the fault and re-excite the generator.

Commonly assigned U.S. patent application Ser. No. 07/968,642 of A. V. Radun et al., filed Oct. 29, 1992, which is a continuation-in-part of now abandoned U.S. patent application Ser. No. 07/859,754, now U.S. Pat. No. 5,289,107 describes a switched reluctance generator system having an excitation bus for providing excitation power thereto which is separate and distinct from a generator bus for providing the output dc voltage thereof. As a result, the average output current generated by the switched reluctance generator is substantially independent of the generator output voltage. Advantageously, therefore, the switched reluctance generator of U.S. patent application Ser. No. 07/968,642 is capable of automatically resuming normal generating operation following occurrence of a short-circuit fault, without requiring a relatively large external power source to supply the high short-circuit current, clear the fault and re-excite the generator.

In addition, U.S. patent application Ser. No. 08/101,623 of A. V. Radun, cited hereinabove, describes a switched reluctance generator system with self-excitation capability, even during load faults, without requiring multiple generator outputs.

Accordingly, it is desirable to provide a switched reluctance generator system capable of generating ac power, without requiring an additional stage of power conversion, that furthermore has self-excitation capability, even during load faults.

SUMMARY OF THE INVENTION

A switched reluctance generator system provides an output ac voltage through only one stage of power conversion. The switched reluctance generator system includes a converter for coupling a dc voltage via a dc excitation bus to a switched reluctance generator and thereby providing excitation power thereto, and further includes a separate ac generator bus for providing the ac output voltage. A bridge-type configuration of thyristor-type switching devices are used to couple power generated across each respective machine phase winding to the ac generator bus. During starting and load faults, the thyristor-type switching devices are turned off such that the ac generator bus is effectively disconnected from the switched reluctance generator, allowing the excitation bus to be charged to a desired level. During normal generating operation, the thyristor-type switching devices are appropriately gated, increasing and decreasing current as needed, to provide the ac output voltage on the ac generator bus.

Advantageously, the switched reluctance ac generator system of the present invention is self-excited after generating action is initiated, even during load faults, and is furthermore capable of resuming normal generating operation following occurrence of a short-circuit fault.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1A:
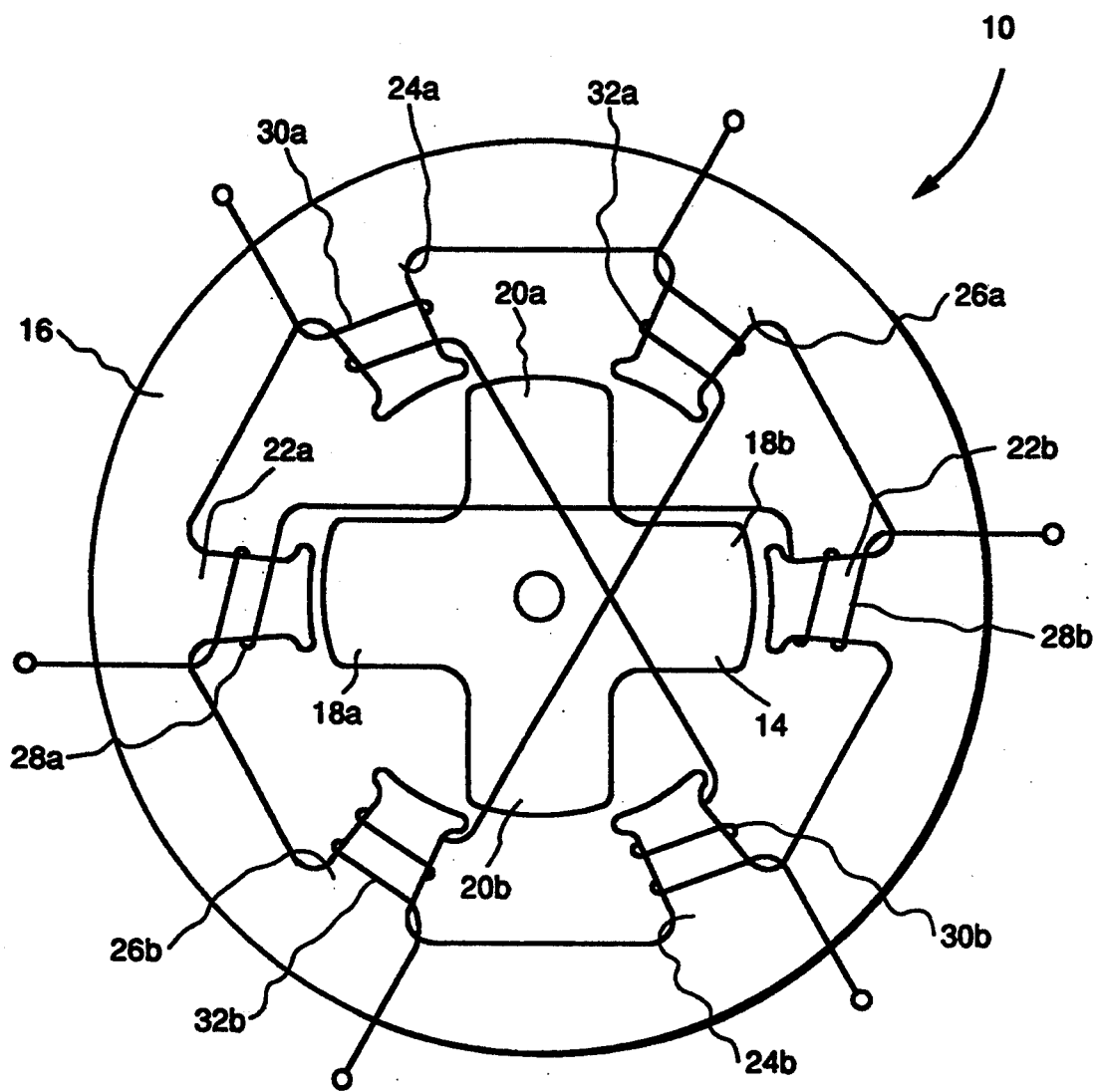
FIG. 1A schematically illustrates a typical switched reluctance machine.

FIG. 1A shows a typical switched reluctance machine configuration. By way of example, switched reluctance machine 10 is illustrated as a three-phase machine, including a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or in parallel to form a machine phase winding.

Figure 1B:
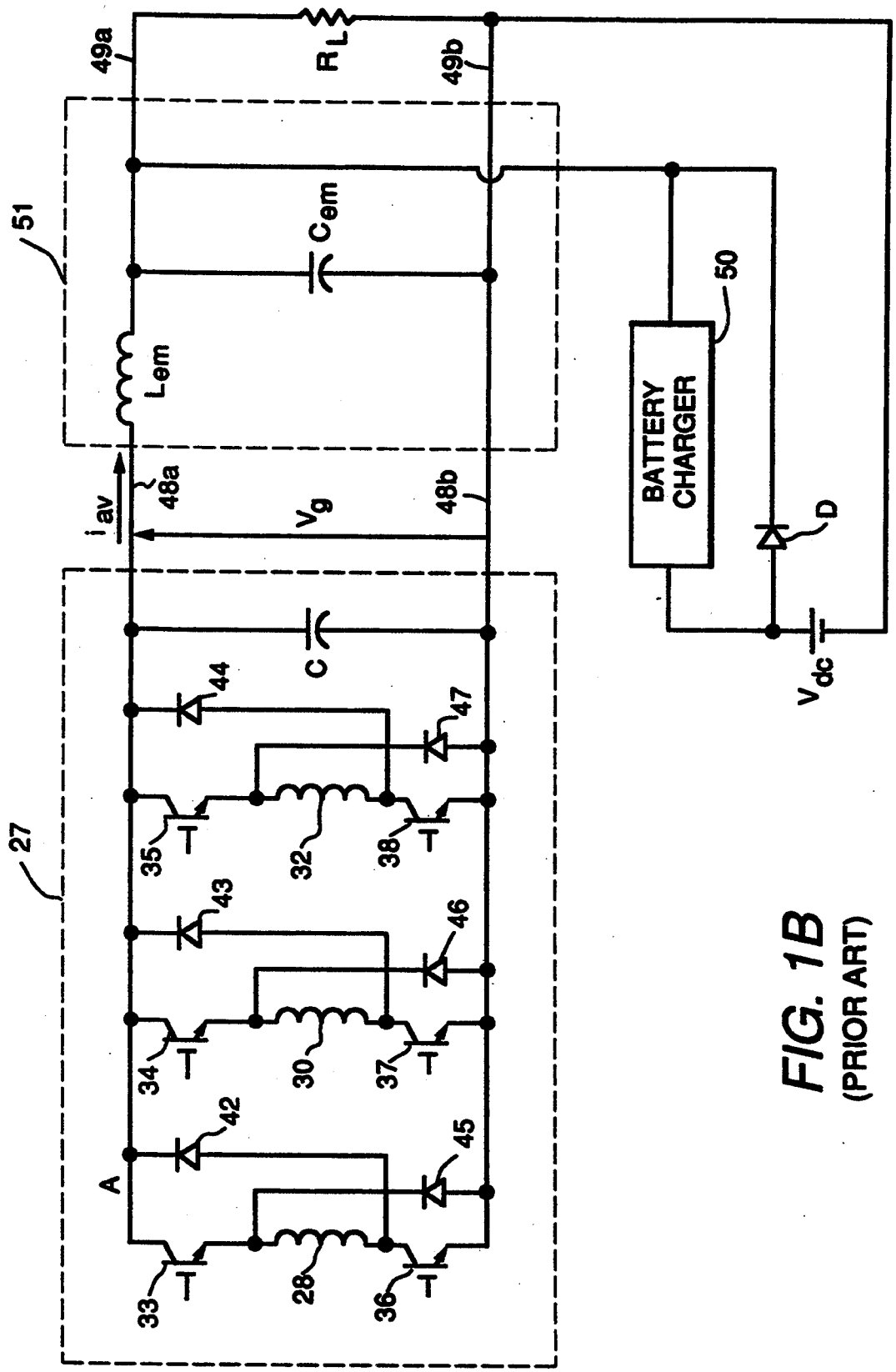
FIG. 1B schematically illustrates a typical switched reluctance generator system.

FIG. 1B illustrates a typical switched reluctance generator system including a converter 27. As illustrated in FIG. 1B, the stator pole windings comprising each companion pair 28, 30 and 32, respectively, are connected in series with each other and with an upper current switching device 33, 34 and 35, respectively, and with a lower current switching device 36, 37 and 38, respectively. The upper and lower switching devices are shown as comprising an insulated gate bipolar transistor (IGBT), but other suitable current switching devices may be used; for example, field effect transistors (FET's), gate turn-off thyristors (GTO's), MOS-controlled thyristors (MCT's) or bipolar junction transistors (BJT's). Each phase winding is further coupled to generator output bus terminals 48a and 48b by flyback or return diodes 42 and 45, 43 and 46, and 44 and 47, respectively. Each series combination of a phase winding with two corresponding switching devices and two flyback diodes comprises one phase leg of converter 27. The converter phase legs are connected in parallel with each other and are connected to the generator output bus terminals 48a and 48b. Capacitance C is also connected to the generator output bus in order to absorb ripple current produced by the machine phases, thereby filtering the dc voltage $V_g$ developed across the generator output bus terminals. The generator system of FIG. 1B is also shown as including an electromagnetic interference filter 51 of a well-known type comprising a capacitance $C_{em}$ and an inductance $L_{em}$. Resistance $R_L$ coupled in parallel with capacitance $C_{em}$ represents the generator load. FIG. 1B also includes a dc source $V_{dc}$, such as a battery or rectified ac source, which is connected to the load output terminals 49a and 49b via the parallel combination of a diode D and a battery charger 50.

In order to establish excitation in the switched reluctance generator during initial start-up, dc voltage is applied to the load bus terminals 49a and 49b by source $V_{dc}$ via the forward-biased diode D. Thereafter, during normal generating operation, the generator bus voltage $V_g$ is greater than the source voltage $V_{dc}$ so that diode D is reverse-biased, and the dc generator bus voltage $V_g$ self-excites the generator machine windings. Disadvantageously, however, if an excessive overload condition, such as a short circuit, occurs, then the generator output voltage $V_g$ falls to zero, resulting in loss of the machine's self-excitation. Diode D becomes forward-biased under these conditions such that the dc source must be large enough to supply the full short-circuit current until the fault is cleared by blowing a fuse or opening a circuit breaker. Restoration of normal generating operation following the fault requires that the dc source have sufficient reserve capacity to apply recovery voltage $V_{dc}$ to the generator bus terminals 48a and 48b via diode D and inductor $L_{em}$ in order to re-excite the generator.

In order to generate ac power using the switched reluctance generator system of FIGS. 1A and 1B, a separate inverter of well-known type (not shown) is coupled to the output of converter 27 (i.e., at output terminals 49a and 49b of FIG. 1B) for converting the dc output voltage to an ac output voltage. Disadvantageously, in such a system, two stages of power conversion are required, reducing efficiency. Furthermore, as another disadvantage, upon occurrence of a load fault in the conventional switched reluctance generator system of FIGS. 1A and 1B, the generator system loses its excitation and thus its ability to generate.

Figure 2:
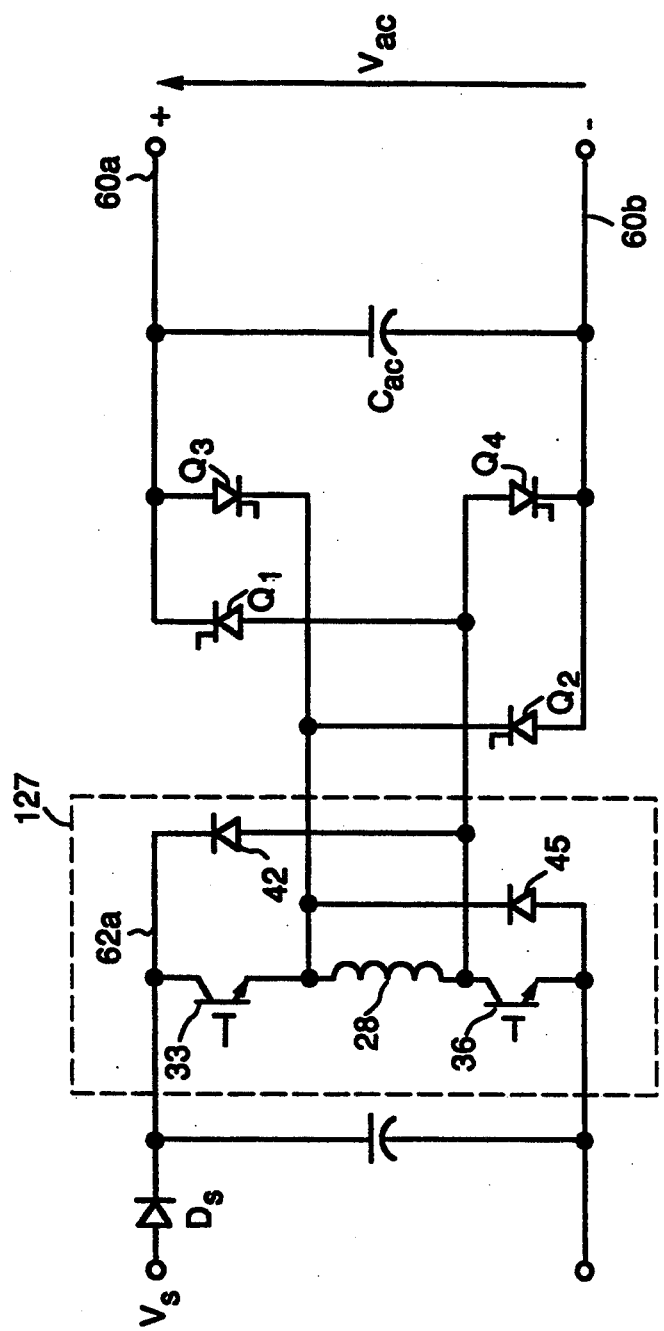
FIG. 2 schematically illustrates a single-phase switched reluctance generator system according to one embodiment of the present invention.

FIG. 2 illustrates a single-phase switched reluctance generator system according to the present invention having a single-phase converter 127 and generator busses 60a and 60b for providing an ac output voltage. Bus 60a represents the positive ac generator bus, and bus 60b represents the negative ac generator bus. The ac generator busses 60a and 60b (collectively, ac generator bus 60) is separate and distinct from an excitation bus 62 which is coupled, via a diode Ds, to a source of dc starting voltage $V_s$ and is further coupled to upper switching device 33 of the switched reluctance converter 127. The cathode of a thyristor-type device Q1 is coupled to positive ac bus 60a, and the anode of device Q1 is coupled to the anode of another thyristor-type device Q4, the cathode of which is coupled to the negative ac generator bus 60b. The junction between devices Q1 and Q4 is coupled to the junction between phase winding 28 and lower switching device 36. The anode of another thyristor-type device Q2 is coupled to negative ac bus 60b, and the cathode of device Q2 is coupled to the cathode of another thyristor-type device Q3, the anode of which is coupled to the positive ac generator bus 60a. The junction between devices Q2 and Q3 is coupled to the junction between phase winding 28 and upper switching device 33. An ac filter capacitor $C_{ac}$ is coupled between positive and negative ac generator busses 60a and 60b. Capacitor $C_{ac}$ has a relatively large capacitance at the phase chopping frequency of the switched reluctance generator, but a relatively small capacitance at the fundamental frequency of the ac generator output voltage $V_{ac}$; i.e., the chopping frequency of the generator is much greater than the ac generator output frequency.

Devices Q1–Q4 have been described as thyristor-type devices. As used herein, the term thyristor-type device refer to a device which blocks reverse voltage, turns off when current through the device goes to zero, and has a controlled turn-on.

In operation, when switches Q1–Q4 are turned off, the ac bus 60 is effectively disconnected from the switched reluctance generator system; hence, the switched reluctance generator provides power to excitation bus 62. When the excitation bus voltage reaches a predetermined value, switches Q1–Q4 are gated on in appropriate fashion to provide current to the ac bus 60. In particular, to provide current of appropriate polarity to increase the ac bus voltage $V_{ac}$, devices Q1 and Q2 are turned; and to reverse the current polarity, and thus decrease the ac bus voltage $V_{ac}$, devices Q3 and Q4 are turned on. Operation proceeds such that the dc excitation bus voltage is greater than or equal to the ac bus voltage at any given instant. Furthermore, by appropriately coordinating the gating of upper and lower switches 33 and 36 with the gating of devices Q1–Q4 allows the excitation bus voltage to vary as the ac load bus voltage.

In the normal generating mode of operation, the current in devices Q1–Q4 can be made to go to zero by turning on upper switch 33 or lower switch 36. Moreover, in a typical square wave mode of operation, the phase current naturally goes to zero at the end of an electrical cycle, turning off Q1–Q4.

Figure 3A:
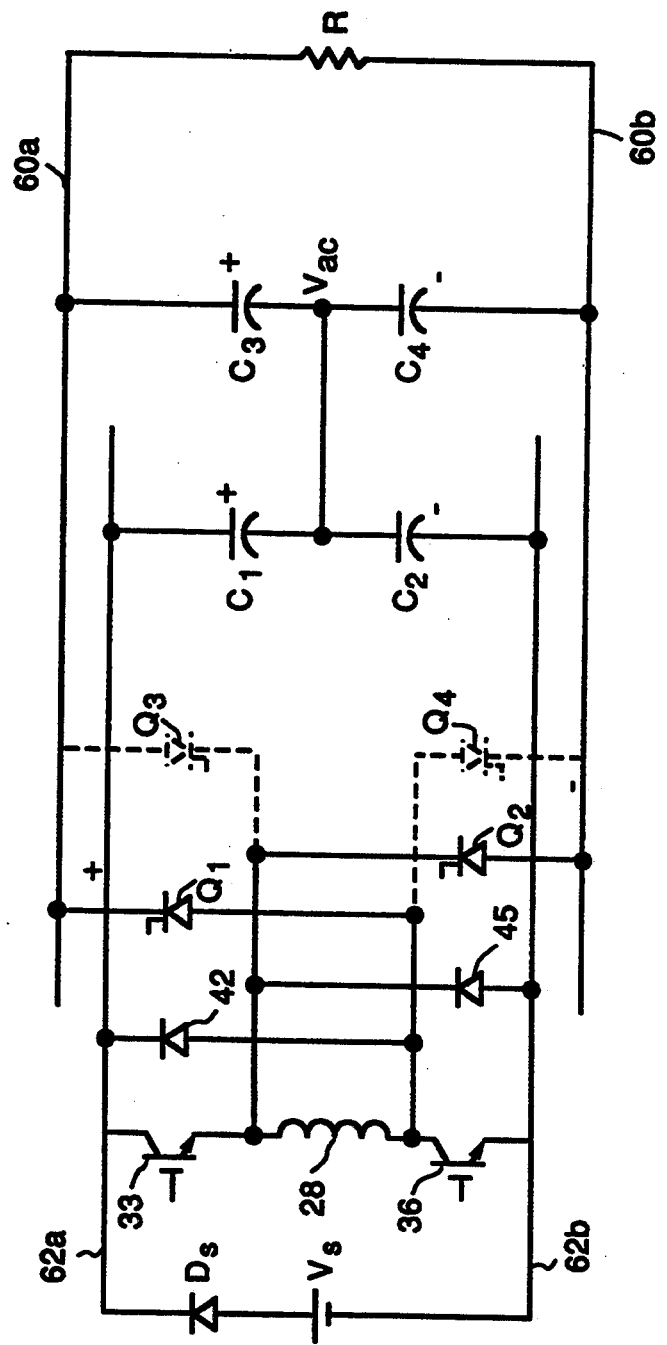
FIG. 3A schematically illustrates one embodiment of a single-phase switched reluctance generator system according to the present invention during the positive half-cycle of the ac output voltage.

FIG. 3A illustrates operation of a switched reluctance generator system according to the present invention during the positive half-cycle of ac output voltage $V_{ac}$. Like the system of FIG. 2, the switched reluctance generator system of FIG. 3A is a single-phase system. However, instead of a single output capacitor $C_{ac}$ such as used in FIG. 2, the system of FIG. 3A employs a capacitive output voltage divider $C_1$–$C_4$. In particular, capacitors $C_1$ and $C_2$ are connected in series with each other, the series combination being coupled across the positive and negative excitation busses 62a and 62b, respectively. Similarly, capacitors $C_3$ and $C_4$ are connected in series with each other, the series combination being coupled across the positive and negative ac generator busses 60a and 60b, respectively. Ideally, capacitors $C_1$–$C_4$ should have equal capacitance values. The junction between capacitors $C_1$ and $C_2$, and the junction between capacitors $C_3$ and $C_4$ are connected to each other. A load across the positive and negative ac generator busses is represented by a resistor R. The capacitive voltage divider $C_1$–$C_4$ is employed to maintain upper and lower limits on the ac generator bus voltage $V_{ac}$.

In FIG. 3A, devices $Q_3$ and $Q_4$ are represented in phantom because they are off during the positive half-cycle of the ac generator output voltage Vac. In this way, current flows through the switched reluctance generator phase and devices $Q_1$ and $Q_2$ in a direction to increase the ac bus voltage $V_{ac}$.

Figure 3B:
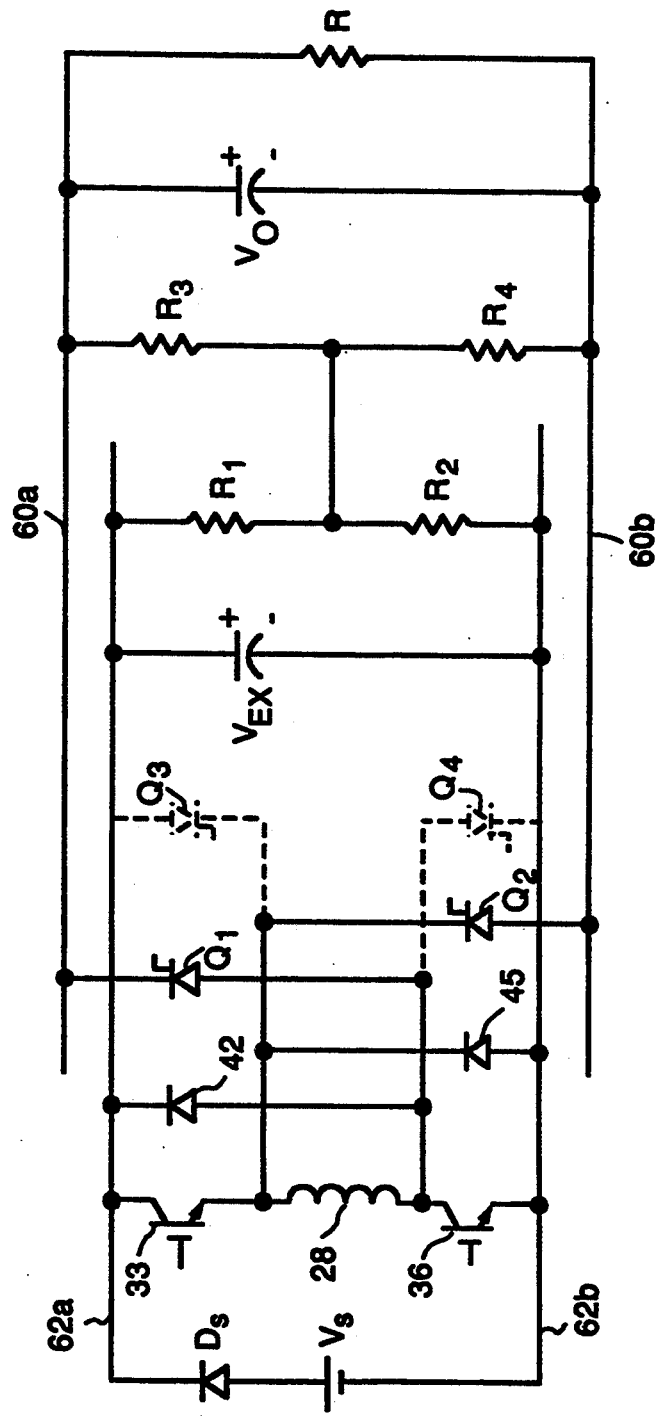
FIG. 3B schematically illustrates one embodiment of a single-phase switched reluctance generator system according to the present invention during the negative half-cycle of the ac output voltage.

FIG. 3B illustrates operation of a switched reluctance generator system according to the present invention during the negative half-cycle of ac output voltage $V_{ac}$. The system of FIG. 3A is similar to the system of FIG. 3B except that the system of FIG. 3B employs a resistive output voltage divider $R_1$–$R_4$. Resistors $R_1$ and $R_2$ are connected in series with each other, the series combination being coupled across the positive and negative excitation busses. Similarly, resistors $R_3$ and $R_4$ are connected in series with each other, the series combination being coupled across the positive and negative ac generator busses. Ideally, resistors $R_1$–$R_4$ should have equal resistance values. The junction between resistors $R_1$ and $R_2$, and the junction between resistors $R_3$ and $R_4$ are connected to each other. Like the capacitive voltage divider illustrated in FIG. 3A, the resistive voltage divider $R_1$–$R_4$ is employed to maintain upper and lower limits on the ac generator bus voltage.

In FIG. 3B, devices $Q_1$ and $Q_2$ are represented in phantom because they are off during the negative half-cycle of the ac generator output voltage $V_{ac}$. In this way, current flows through the switched reluctance generator phase and devices $Q_1$ and $Q_2$ in a direction to decrease the ac bus voltage $V_{ac}$.

During load faults, such as excessive overloads or short circuits, the ac bus voltage $V_{ac}$ falls to zero, and switches $Q_1$–$Q_4$ are turned off, effectively disconnecting the generator bus from the generator system, such that the generating power charges the excitation bus. Furthermore, with devices $Q_1$–$Q_4$ turned off, the excitation bus cannot discharge into the ac output bus. When the excitation bus again reaches the predetermined voltage, devices $Q_1$–$Q_4$ are appropriately turned on so that the generator can provide current to clear the fault.

Figure 4:
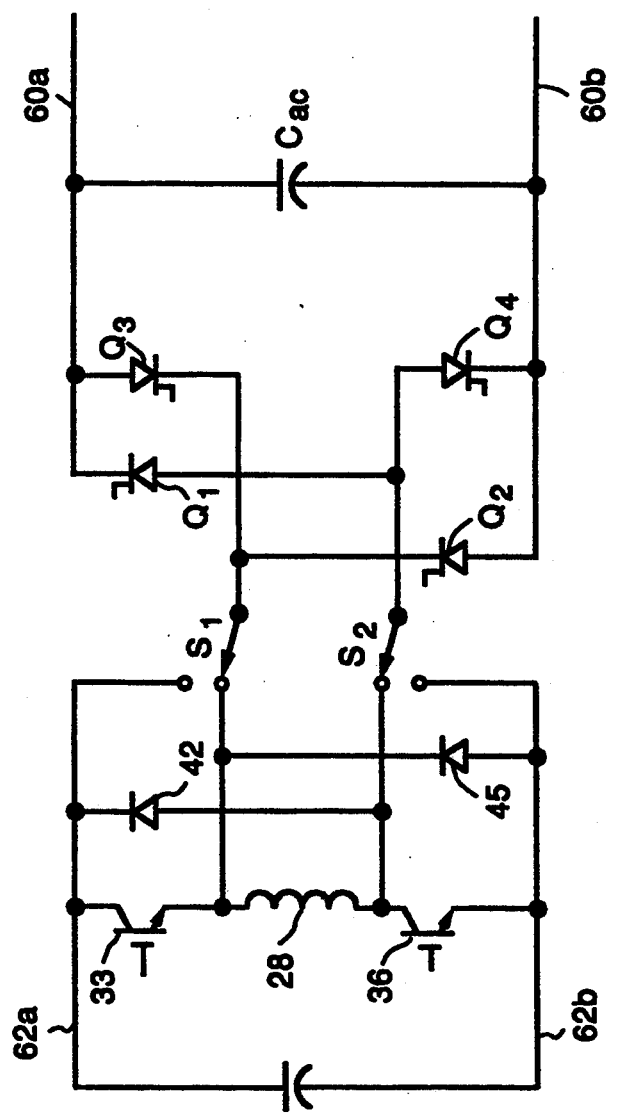
FIG. 4 schematically illustrates a single-phase switched reluctance generator system according to an alternative embodiment of the present invention.

FIG. 4 illustrates an alternative embodiment of a single-phase switched reluctance generator system of FIG. 2. As shown, the system of FIG. 4 includes a switch S1 coupled between the cathodes of Q2 and Q3 and the junction joining winding 28 and upper switch 33. A second switch S1 is coupled between the anodes of Q1 and Q4 and the junction joining winding 28 and lower switch 36. Switches S1 and S2 are added to facilitate using the switched reluctance generator as a motor in an engine starter/generator application, for example. In particular, during engine starting, switches S1 and S2 are each in position 1 and switches Q2 and Q3 are on such that the excitation bus is directly coupled to the ac generator bus, as in conventional switched reluctance generator systems. After initiation of generating action, switches S1 and S2 are each moved to position 2 and operation proceeds as described hereinabove.

Figure 5:
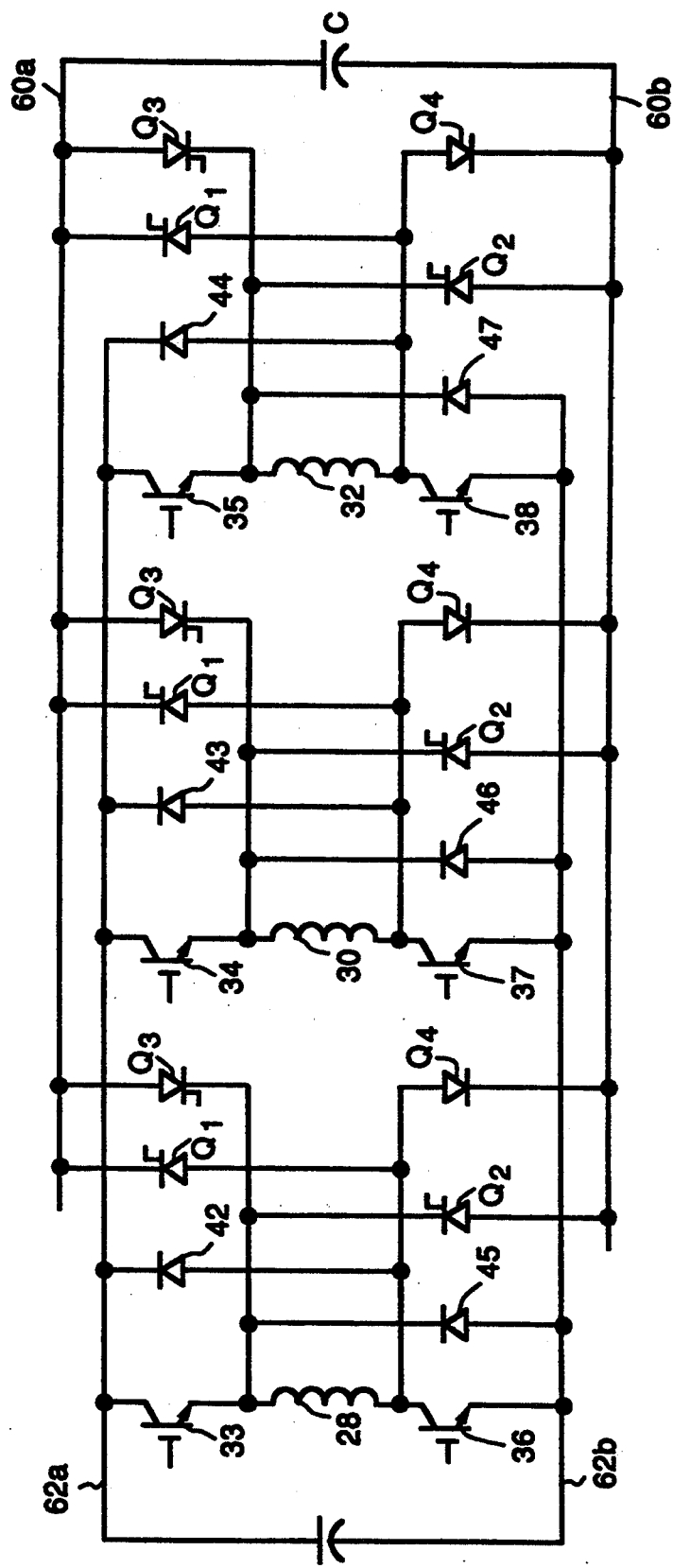
FIG. 5 schematically illustrates a three-phase switched reluctance generator system for generating a single-phase ac output voltage according to the present invention.

FIG. 5 illustrates an alternative embodiment of the present invention wherein a three-phase switched reluctance generator system is employed to generate a single-phase ac output voltage. Advantageously, the system of FIG. 5 generates less high-frequency ripple than the systems of FIGS. 1–4. In an exemplary implementation of a switched reluctance generator system of FIG. 5, a switched reluctance machine having 6 stator poles and 4 rotor poles is employed.

In the system of FIG. 5, it is assumed that the phase chopping frequency the switched reluctance generator system is much higher than the fundamental frequency of the ac output voltage if the generator system is operated in the full square (i.e., constant power) mode; hence, the switched reluctance generator is controlled to produce the desired ac fundamental frequency. Alternatively, the system could be designed so that the switched reluctance generator system chops at a much higher frequency than the ac fundamental frequency, thus allowing the system to be controlled to produce the desired ac fundamental frequency.

Figure 6:
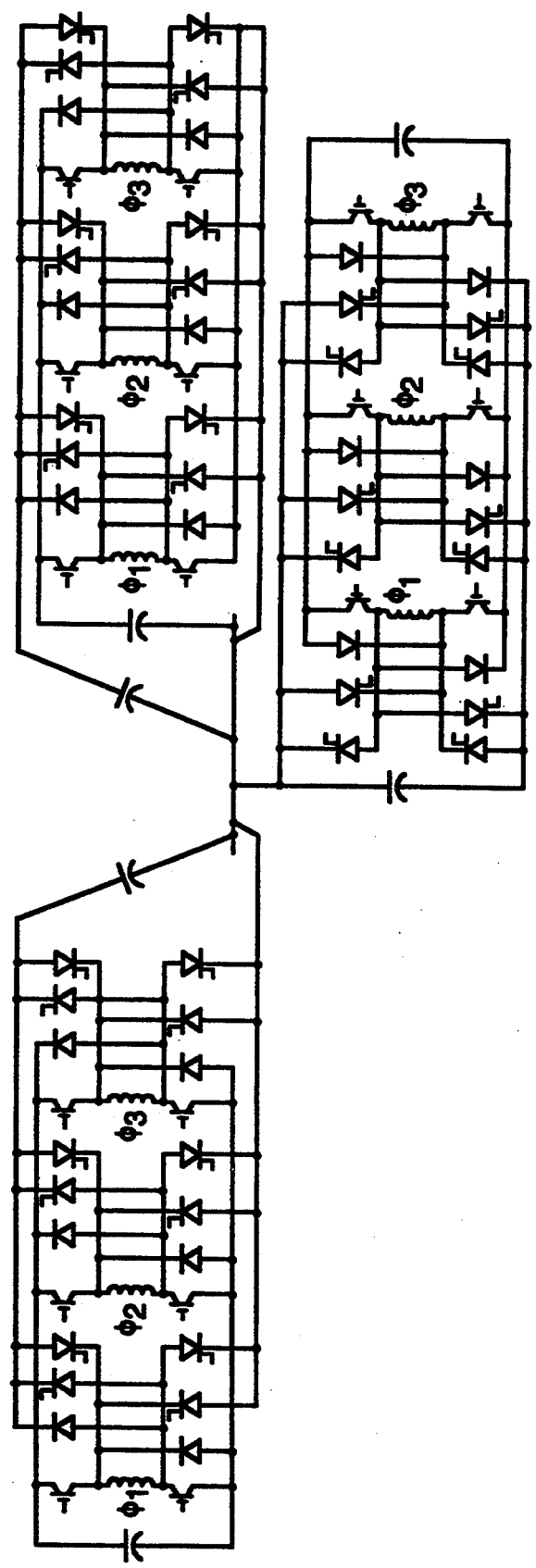
FIG. 6 schematically illustrates a Y-connected three-phase switched reluctance generator system for generating a three-phase ac output voltage according to the present invention.

FIG. 6 illustrates another alternative embodiment of a switched reluctance generator system of the present invention having a three-phase Y-connected ac output using, for example, a switched reluctance machine having 18 stator poles and 12 rotor poles.

Advantageously, for all embodiments described hereinabove, the dc power source Vdc can be a very low power source since, with switches $Q_1$–$Q_4$ turned off during initiation of generating action, there is no load on the excitation bus. As another advantage, the combined current rating of a flyback diode pair and a pair of devices $Q_1$-$Q_2$ or $Q_3$-$Q_4$ is required to be no greater than that of a flyback diode pair in a conventional switched reluctance generator system, such as that of FIGS. 1A and 1B.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A switched reluctance generator system, comprising:
   a switched reluctance generator including a stator having at least one pair of opposing stator poles with a machine phase winding wound thereon and further including a rotor having at least one pair of opposing rotor poles;
   a converter for coupling a dc voltage from a dc power source via a dc excitation bus to said switched reluctance generator and thereby providing power to excite said generator;
   an ac generator bus coupled via switch means to each said machine phase winding for providing an ac output voltage, said switch means providing for current flow in one direction during each first half-cycle of said output ac voltage and providing for current flow in a reverse direction during each second half-cycle of said ac output voltage.

2. The switched reluctance generator system of claim 1 wherein said switch means is controlled to prevent current flow to said ac generator bus during initiation of generating action and during load faults.

3. The switched reluctance generator system of claim 1 wherein said switch means comprises four thyristor-type switches arranged in a bridge configuration for each respective phase.

4. The switched reluctance generator system of claim 1 wherein said converter comprises at least one switching device connected in series with each said machine phase winding.

5. The switched reluctance generator system of claim 4, further comprising flyback diode means coupled to each said machine phase winding, each said flyback diode means being coupled to said excitation bus for preventing said excitation bus from discharging into the respective machine phase winding coupled thereto.

6. The switched reluctance generator system of claim 1, further comprising blocking means for preventing said excitation bus from discharging into said dc source.

7. The switched reluctance generator system of claim 1, further comprising starting means for directly coupling said ac generator bus to said excitation bus during motoring operation.

8. The switched reluctance generator system of claim 6 wherein said starting means comprises switches.

9. The switched reluctance generator system of claim 1 wherein said switched reluctance generator comprises a single phase and said ac output voltage comprises a single phase.

10. The switched reluctance generator system of claim 1 wherein said switched reluctance generator comprises three phases and said ac output voltage comprises a single phase.

11. The switched reluctance generator system of claim 1 wherein said switched reluctance generator comprises nine phases and said ac output voltage comprises three phases.

* * * * *